United States Patent [19]
Blind et al.

[11] Patent Number: 5,863,024
[45] Date of Patent: Jan. 26, 1999

[54] MICRO-ELECTROMAGNET INCLUDING AN INTEGRATED MAGNETIC CIRCUIT AND COIL

[75] Inventors: Pascal Blind, Besancon; Abdelkrim Choujaa, Fraisans; Olivier Ngoagouni, Coligny, all of France

[73] Assignee: Crouzet Automatismes, Valence, France

[21] Appl. No.: 573,955

[22] Filed: Dec. 19, 1995

[30] Foreign Application Priority Data

Dec. 30, 1994 [FR] France .................................. 94 16009

[51] Int. Cl.⁶ .................................................. F16K 31/06
[52] U.S. Cl. ................. 251/129.01; 251/65; 251/129.06; 29/890.124
[58] Field of Search ........................ 251/129.06, 129.15, 251/129.01, 65; 29/890.122, 890.124

[56] References Cited

U.S. PATENT DOCUMENTS

| | | | |
|---|---|---|---|
| 5,058,856 | 10/1991 | Gordon et al. .............................. | 251/11 |
| 5,096,643 | 3/1992 | Kowanz et al. ....................... | 137/15 X |
| 5,238,223 | 8/1993 | Mettner et al. ................. | 251/129.06 X |
| 5,322,258 | 6/1994 | Bosch et al. .................... | 251/120.01 X |
| 5,351,934 | 10/1994 | Jensen et al. .............................. | 251/65 |

FOREIGN PATENT DOCUMENTS 3621332  1/1988  Germany .

OTHER PUBLICATIONS

Article entitled "A Planar Micromachined Spiral Inductor for Integrated Magnetic Microactuator Applications" by Chong Ahn and Mark G. Allen.
Article: "Microfabricated Actuator with Moving Permanent magnet" by B. Wagner, W. Benecke.
Article: "Sensors and Actuators A Physical" by Elsevier Science S.A.
Patent PCT/DE93/00494—Title: "Microvalve" by Mettner, Michael, et al.

*Primary Examiner*—Kevin Lee
*Attorney, Agent, or Firm*—Plevy & Associates

[57] ABSTRACT

An electromagnetic micro-actuator includes a coil for generating a magnetic field which acts on a movable element at least partially made of a magnetic material, and a magnetic circuit to drive the magnetic flux towards a gap closable by the motion of the movable element.

9 Claims, 6 Drawing Sheets

MICRO-ELECTROMAGNET INCLUDING AN INTEGRATED MAGNETIC CIRCUIT AND COIL

BACKGROUND OF THE INVENTION

1. Field of the Invention

The present invention relates to a micro-electromagnet, or an electromagnetic actuator. It more particularly applies to the fabrication of such an actuator by using technologies derived from those used for the fabrication of integrated circuits.

2. Discussion of the Related Art

In electromagnetic actuators, the generation of a magnetic field with a coil causes the displacement of an element sensitive to this field. Electromagnetic actuators especially apply to electrical relays, displacement sensors, electrovalves, and so on.

In the case of an electrovalve, the actuator is used to open or to close the passageway of a fluid inside a valve body. In miniaturized applications to which the invention relates, actuators generally act on a deformable diaphragm constituting a flap which is displaced by the actuator to close or to open a seat defining a passageway for the fluid and formed, for example, in a silicon plate.

Electromagnetic microvalves are particularly advantageous as compared with other types (electrostatic, piezoelectrical, thermo-fluid, opto-fluid or thermo-mechanical) of microvalves, because they provide a maximum of useful performances for a microvalve, namely the deformation ability of its diaphragm, the power of its actuator, its low electrical consumption, its supply voltage requirement, its response delay.

However, electromagnetic microvalves are very complex to fabricate because of the presence of an electromagnet and, in the prior art, have never been fully incorporated in integrated systems.

FIGS. 1A and 1B represent an example of a conventional electromagnetic microvalve whose valve body is formed by using the integrated circuit technology. FIG. 1A is a cross-sectional view of the microvalve. FIG. 1B is a partial top view of the valve body. The section plane of FIG. 1A is indicated by a dotted line A-A' in FIG. 1B.

Electromagnetic microvalves conventionally comprise a valve body 1, defining passageways for a fluid, and an electromagnetic actuator 2 combined with a diaphragm 3 for obturating one or more of the passageways.

The valve body 1 is formed from an etched plate, for example made of silicon, in order to define two transverse passages, an input 4 and an output 5, respectively, for the fluid. An annular seat 6, for cooperating with the diaphragm 3, is also formed in the silicon plate about an aperture 5' of the output passageway 5 which leads substantially in the middle of the circular diaphragm. The diaphragm 3 lies on a peripheral ring 7 protruding over the surface of the valve body which faces the diaphragm.

The electromagnetic actuator 2 is disposed over the achieved valve body, once diaphragm 3 is positioned. A ring 8 receiving a coil 9 is, for example, glued to the valve body 1. In the given example, ring 8 has an internal threading 10 adapted to cooperate with the external thread 11 of the solenoid constituting coil 9. The lower end of the coil lies on the diaphragm 3, over ring 7 which receives the periphery of the diaphragm. The diaphragm 3 is thus seal-pinched between the ring 7 and the coil 9.

A permanent magnet, in this case a cylindrical bar 12 made of a permanent magnetization material, is loosely disposed in the center of coil 9. The magnet 12 constitutes a movable element adapted to be axially displaced by coil 9.

When a current flows through coil 9, the magnetic field generated inside the coil causes bar 12 to slide down, which moves the diaphragm 3 to make it rest on seat 6. The valve is then closed, which blocks the flow of the fluid from the input passageway 4 up to the output passageway 5. To open the valve, it is generally sufficient to cancel the magnetic field by canceling the biasing of coil 9 so that the pressure on the diaphragm, of the fluid incoming in the valve, allows the communication with the output passageway 5.

A drawback of conventional electromagnetic microvalves is that their fabrication is complex because the coil and the permanent magnet are not integrated but are discrete elements that are added on the valve body. In addition, this method does not allow the implementation of a complete batch manufacturing such as the one used to make the valve body.

SUMMARY OF THE INVENTION

An object of the present invention is to avoid the above drawbacks by providing an electromagnetic micro-actuator all elements of which are fabricated using technologies derived from those developed for the fabrication of integrated circuits. The invention also applies to a batch manufacturing of complete electromagnetic microvalves by using these technologies.

To achieve these objects, the present invention provides an electromagnetic micro-actuator comprising a coil for generating a magnetic field which acts on a movable element at least partially made of a magnetic material, and including a magnetic circuit to drive the magnetic flux to a gap that is closable by the motion of the movable element.

According to an embodiment of the invention, the micro-actuator includes a first plate on a first surface of which is formed the coil and in the thickness of which are formed transverse portions of the magnetic circuit, a central portion defining the fixed end of the gap.

According to an embodiment of the invention, the micro-actuator includes a second plate from which are formed the movable element and arms for hanging the movable element to peripheral areas. The movable element faces the central portion of the first plate with which it defines the gap, the movable element and its hanging arms being at least partially made of a magnetic material.

According to an embodiment of the invention, the hanging arms are exclusively made of a magnetic material.

According to an embodiment of the invention, the movable element is connected to the central portion of the first plate by a continuous magnetic circuit including the hanging arms. The other transverse portions of the first plate and a magnetic cover abutting against the first surface of the first plate.

According to an embodiment of the invention, the movable element constitutes a flap closing at least one passageway of a fluid to form an electromagnetic microvalve.

According to an embodiment of the invention, the passageway is constituted by a transverse aperture formed in a third plate and leading in front of the flap.

According to an embodiment of the invention, the micro-actuator further includes an exhaust aperture leading to the gap from the first plate, the exhaust aperture being adapted to be closed by the flap.

The invention also relates to a method for fabricating an electromagnetic micro-actuator including a coil for generating a magnetic field that acts on a movable element at least partially made of a magnetic material. The method includes the following steps:

- etching out, from a first surface of a first plate, three recesses for defining transverse passageways of a magnetic circuit, a central recess being shallower than the two other recesses;
- filling the recesses with a magnetic material and forming, on the first surface, a coil by a plane winding about the central recess;
- etching out the surface opposite to the coil so that the magnetic material filling the recesses appears on the opposite surface, while forming a shoulder about and apart from the central recess;
- forming, in a magnetic material deposited on a second plate and on a surface area equivalent to the surface area which, in the first plate, includes the magnetic material fillings, a central portion suspended by arms to a peripheral area;
- piling the plates by aligning the central filling of the first plate with the central portion of the second plate, to define a gap having a movable end defined by the central portion of the second plate and having a fixed end constituted by the central filling of the first plate; and
- assembling, over the first surface of the first plate, a magnetic cover contacting the fillings.

According to an embodiment of the invention, the plates are made of silicon and the magnetic material is made of ferro-nickel.

The foregoing and other objects, features, aspects and advantages of the invention will become apparent from the following detailed description of the present invention when taken in conjunction with the accompanying drawings.

BRIEF DESCRIPTION OF DRAWINGS

FIGS. 4A–4G illustrate steps of an implemention of a method for fabricating a second plate of an actuator such as the one represented in FIGS. 2A–2C;

For the sake of clarity, the figures are not drawn to scale and the same elements are referenced in the various figures with the same reference characters.

DETAILED DESCRIPTION

Figure 1A:
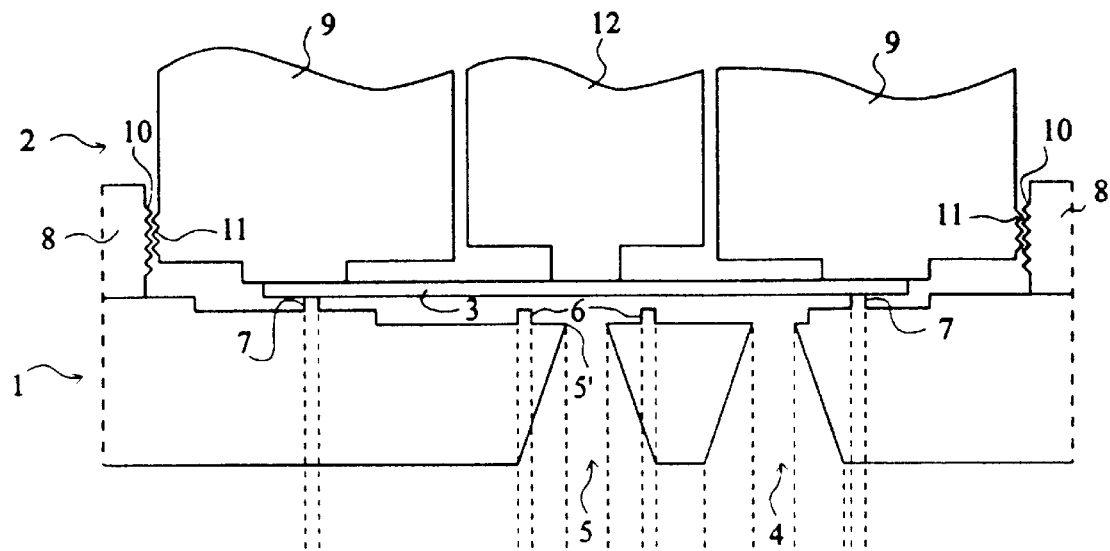
FIGS. 1A and 1B, above described, illustrate the state of the art and the problem encountered.
Figure 1B:
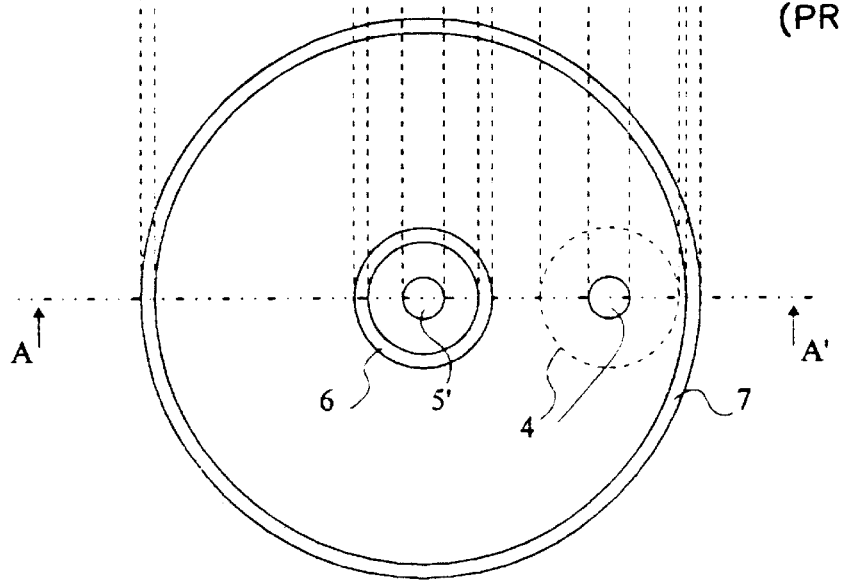
Figure 2A:
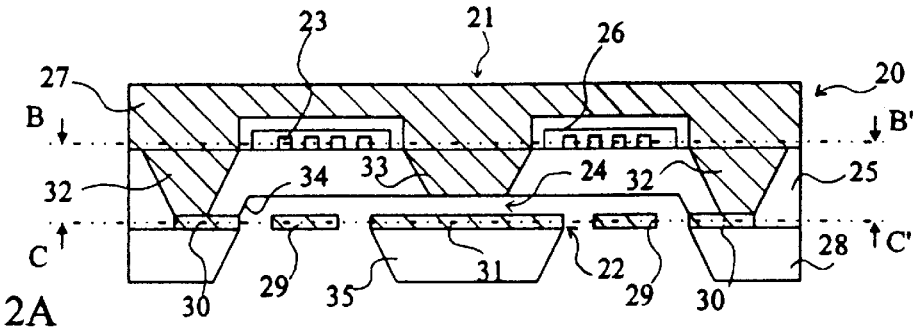
FIGS. 2A–2C are transverse and longitudinal cross-sectional views of an embodiment of an electromagnetic micro-actuator according to the present invention.
Figure 2B:
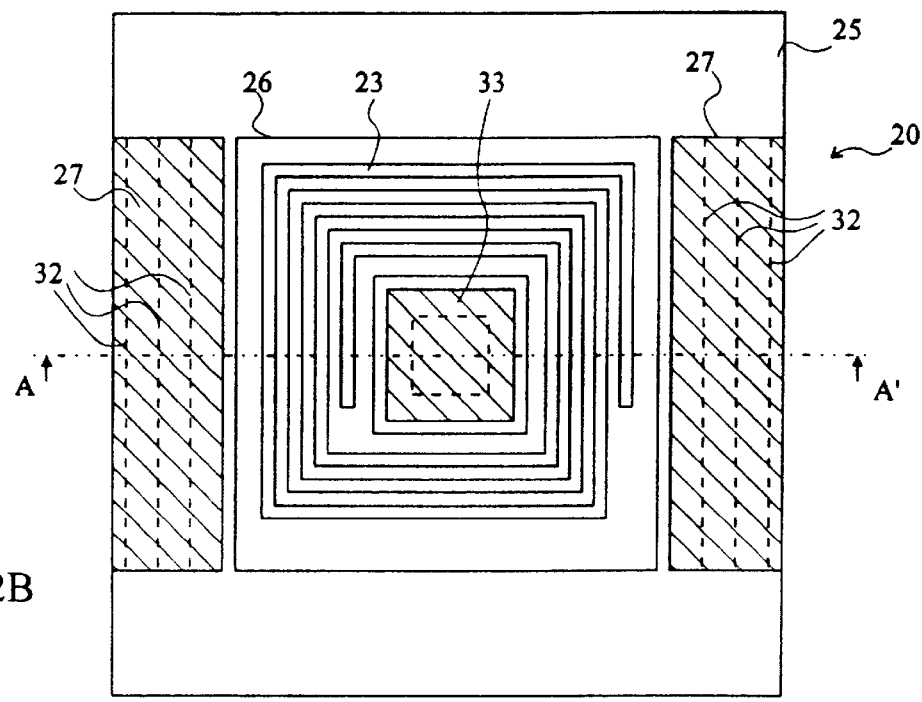
Figure 2C:
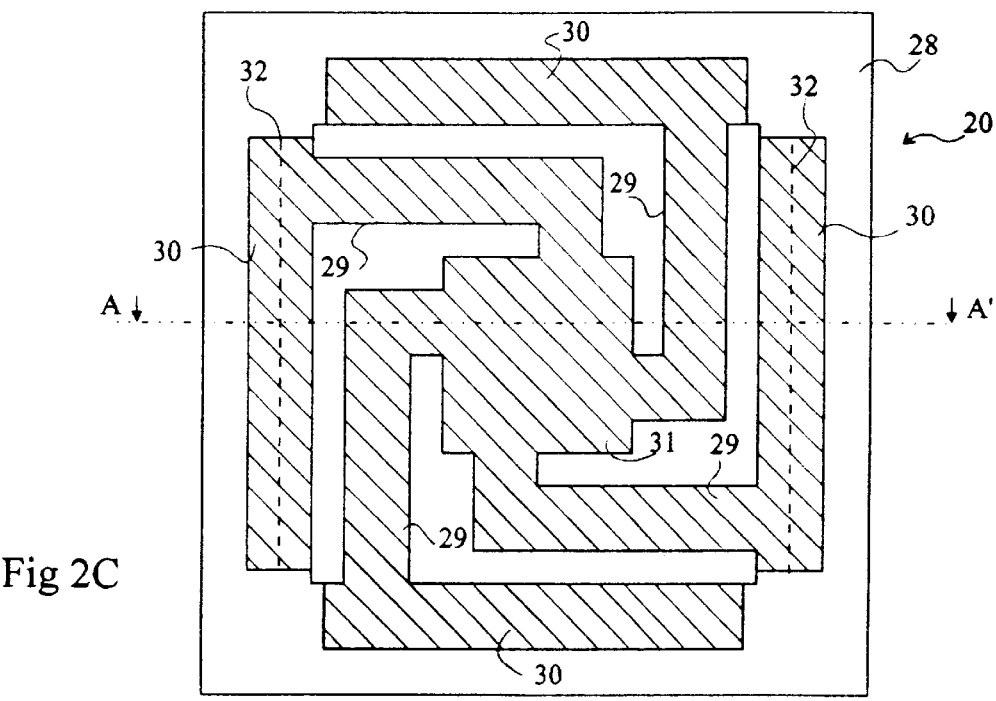

FIG. 2A is a cross-sectional view of the structure of a micro-electromagnet, or electromagnetic actuator according to the invention. FIG. 2B is a top longitudinal cross-sectional view, along line B-B' of FIG. 2A. FIG. 2C is a bottom longitudinal cross-sectional view, along line C-C' of FIG. 2A. The transverse sectional plane of FIG. 2A is indicated by lines A-A' in FIGS. 2B and 2C.

As indicated in FIG. 2A, an electromagnetic actuator according to the invention includes a magnetic circuit 20 having a fixed portion 21 and a movable element 22. The magnetic circuit surrounds a coil 23 to drive the magnetic flux toward a gap 24 formed in the circuit 20 under the center of coil 23.

A characteristic feature of the invention is that a first end of gap 24 is defined by the movable element 22, which closes the gap under the action of the magnetic field.

The movable element 22 of the magnetic circuit 20 and coil 23 are, for example, realized from plates such as those used to form integrated circuit substrates, such as silicon plates.

Coil 23 is, according to the invention, realized by a plane winding (FIG. 2B) preferably having straight portions to facilitate its fabrication over a first plate 25, for example made of silicon, preferably oxidized. Coil 23 is obtained by depositing a conductive material on plate 25. An insulating layer 26 electrically protects coil 23 from a magnetic cover 27 closing the magnetic circuit 20.

The movable element 22 of the magnetic circuit 20 is formed by a layer constituted by a soft magnetic material, for example, soft iron, ferro-silicon, ferro-cobalt or ferro-nickel. The magnetic material is selected with a high permeability (low reluctance) and a low remanence so that the movable element is restored to its initial position after a cut off of the coil supply. This layer is formed over a second plate 28, for example made of silicon, preferably oxidized.

The plate 28 is etched out according to a pattern defining hanging arms 29 extending from peripheral areas 30 up to a central portion 31 constituting the movable end of gap 24. A movable element 35 is thus formed by the central portion 31 of the magnetic circuit as well as a silicon portion on which this central portion is disposed.

The junction between the magnetic cover 27 and the peripheral areas 30 is realized by transverse portions, or portions 32 filling crossing passages that are formed in the first plate 25. A second fixed end of gap 24 is also formed by a transverse portion 33 filling a passageway that crosses the plate 25 near the center of the coil 23. Plate 25 has, on its surface facing the plate 28, a shoulder 34 which fixes the distance between the two ends of gap 24. The shoulder 34 enables the movable element 35 to move under the action of the magnetic field.

Thus, all the elements of the electromagnetic actuator are integrated and can be realized by a batch process on silicon wafers. The wafers are assembled after formation of all the elements of the actuators that they form, and are then cut to individualize the actuators.

According to an alternative of the invention, the hanging arms 29, the peripheral areas 30 and the central area 31 are realized from plates made of a soft magnetic material. The plates can be, for example, conventionally cut, worked or photoetched, without a silicon substrate. Also, in this case, a batch manufacturing process is used by assembling these plates which can have the same shape as the silicon wafers forming, for example, the plate 25 before cutting into individual actuators. Optionally, the plates made of a magnetic material can be square and suitably positioned on the silicon wafers.

FIGS. 3A–3G, 4A–4F and 5 illustrate an embodiment of the invention for obtaining, from silicon wafers, an actuator structure such as represented in FIGS. 2A–2C.

FIGS. 3A–3G are partial cross-sectional views of the plate 25 supporting coil 23 at various steps of the method according to the invention.

First, plate 25 is subjected to a thick oxidation (not shown) on its two surfaces.

In the first plate 25 are realized blanks 41 (FIG. 3A) of crossing passageways for receiving the magnetic material fillings 32. The blanks 41 are photoetched. They have a low depth (for example, approximately 50 $\mu$m) which corresponds, as will be explained hereinafter, to the desired height of gap 24.

Then, still using a photoetching process, a deep etching step is carried out (FIG. 3B) to obtain recesses 43 and 44, respectively. The depth of recesses 43 and 44 corresponds to the desired thickness of fillings 32 and 33, respectively. The deep etching step is, for example, achieved with a depth of 270 $\mu$m, so that the depths of recesses 43 and 44 are approximately 320 $\mu$m and 270 $\mu$m, respectively.

Etching steps are, for example, of the isotropic chemical etching type. The etch angle in the silicon plate is due to the crystalline structure of the silicon and is approximately 54° in the case of a wafer whose cutting plane corresponds to a plane (1, 0, 0).

Figure 3A:
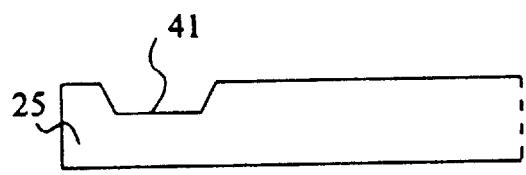
FIGS. 3A–3G illustrate steps of an implemention of a method for fabricating a first plate of an actuator such as the one represented in FIGS. 2A–2C.
Figure 3B:
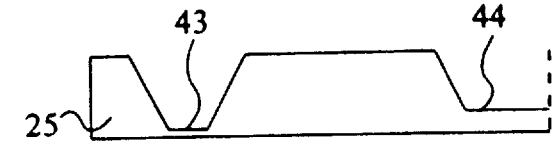
Figure 3C:
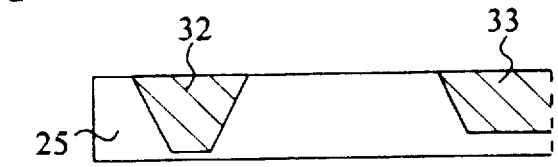

A thin conductive layer (not shown), for example chromium, is deposited in recesses 43 and 44 through a lift-off process (not shown). The soft magnetic material, for example, a ferro-nickel, is deposited by electroforming in recesses 43 and 44 and the fillings 32 and 33 are obtained (FIG. 3C).

Coil 23 (FIG. 3D) is then realized in the same way as that used for the formation of fillings 32 and 33. In other words, a thin layer of chromium (not shown) is sprayed over a layer of resist (not shown) etched according to the pattern of the coil and constituting a lift-off layer for the chromium residues. The remaining chromium layer constitutes a bonding layer for a conductive material, for example copper, deposited by electroforming in a resist mask (not shown) whose thickness corresponds at least to the desired thickness for coil 23.

Then, successive etching steps are carried out from the bottom surface of the plate 25 (FIGS. 3E and 3F) for having the fillings 32 and 33 to cross the plate 25 and for providing a silicon/silicon contact between plates 25 and 28.

A first etching step causes the fillings 32 to cross the plate to ensure continuity of the magnetic circuit toward the exterior of coil 23 and enables silicon/silicon contact between the plates 25 and 28. As shown, a shoulder 45 is formed. The depth of shoulder 45 is selected as a function of the desired thickness of the movable element of the magnetic circuit and is, for example, approximately 60 $\mu$m. Taking into account the various etching depths indicated above, plate 25 can initially have a thickness of approximately 380 $\mu$m.

A second etching step causes filling 33 to cross a central portion of an actuator. A shoulder 34 (FIG. 3F) is formed. The depth of shoulder 34 corresponds to the selected depth of the gap 24 and is, for example, approximately 50 $\mu$m.

Last, an insulation layer 26 (FIG. 3G) is deposited over coil 23.

Figure 3D:
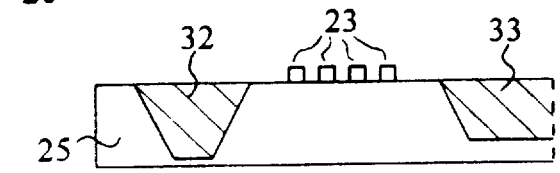
Figure 3E:
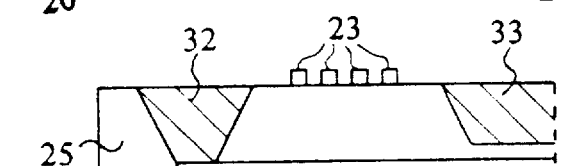

The steps of the method according to the invention above described can be implemented in a different order. For example, the insulating layer 26 can be formed over the structure as represented in FIG. 3D, before etching the bottom surface of the plate 25.

Figure 4A:
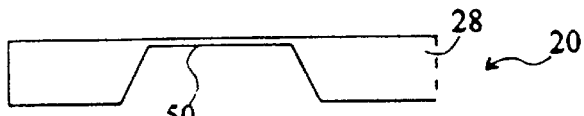
Figure 4B:
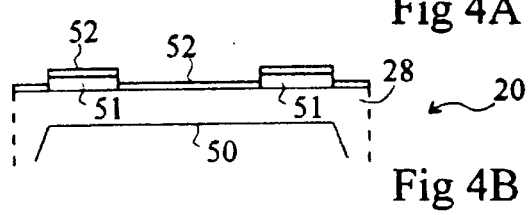
Figure 4C:
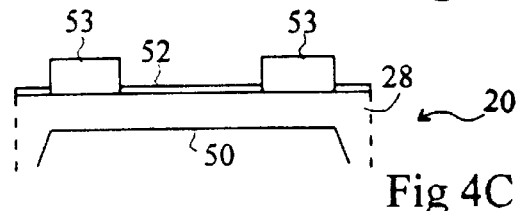
Figure 4D:
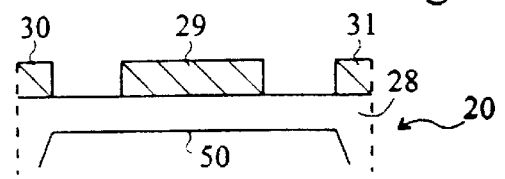
Figure 4E:
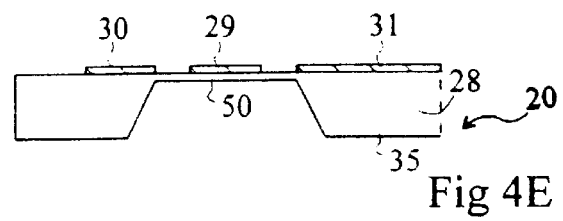

FIGS. 4A–4F are partial cross-sectional views of plate 28 supporting the movable element 22 of the magnetic circuit 20 at various steps of the method according to the invention. For the sake of clarity, FIGS. 4B–4D are enlarged views of the central portion represented in FIGS. 4A and 4D–4F where the hanging arms 29 are formed.

Plate 28 is first subjected to a thick oxidation (not shown) on its two surfaces.

An anisotropic photoetching step is carried out from the bottom surface of plate 28 to define patterns 50 (FIG. 4A) in which will be formed the hanging arms 29 separated from the peripheral areas 30 and from the central area 31. The etching step is stopped at a short distance (for example, approximately 20 $\mu$m) from the front surface of plate 28 designed to support the movable element 22 of the magnetic circuit 20. The remaining portion of plate 28, beneath the central portion 31, constitutes therewith the movable mass 35.

Then, the pattern of the apertures between the hanging arms 29 and the peripheral and central areas 30, 31 is defined by a thin resist layer 51 (FIG. 4B) according to the desired pattern. The resist layer 51 is used as a lift-off layer of a thin bonding layer 52, for example made of chromium 52, which is then deposited.

Once layer 52 is opened, a resist layer 53 (FIG. 4C) is formed according to the pattern of the apertures that are opened in layer 52. The thickness of the resist layer 53 is selected so as to be at least equal to the desired thickness for the movable element 22 of the magnetic circuit 20.

Then, a soft material, for example a ferro-nickel, is deposited by electroforming in the pattern defined by the resist layer 53. The thickness of this material which defines the movable element 22 is, for example, approximately 60 $\mu$m. Once layer 53 is lifted off (FIGS. 4D and 4E), the hanging arms 29, the peripheral areas 30 and the central area 31 are formed in the magnetic material.

Finally, an anisotropic photoetching step (FIG. 4F) is achieved to eliminate the small residual thickness of plate 28 in register with the hanging arms 29 and the apertures which separate arms 29 from the peripheral and central areas 30, 31.

According to an alternative of the invention (not shown), the etching of plate 28 carried out during the first step represented in FIG. 4A extends beneath the central area 31 so that silicon only remains at the periphery of the movable element 22.

Figure 5:
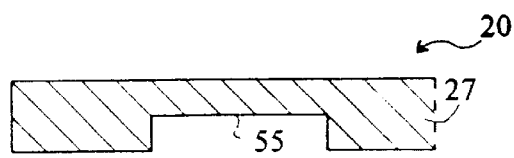
FIG. 5 is a partial cross-sectional view of an embodiment of a magnetic cover of an actuator such as the one represented in FIGS. 2A–2C.

FIG. 5 illustrates an example of the possible shape of the magnetic cover 27 designed to close the magnetic circuit 20 above coil 23. Such a cover, for example manufactured from a plate made of soft magnetic material, such as soft iron, ferro-silicon, ferro-cobalt or ferro-nickel, can be simply hollowed to form a groove 55 to receive the coil 26 which protrudes from the plate 25.

When plates 25 and 28 and cover 27 are formed, they are assembled, for example by welding or gluing. The movable element 22 of the magnetic circuit is engaged in the volume defined by the shoulder 45 of the plate 25, so that the silicon of plate 25 lies on the silicon of plate 28 outside the magnetic circuit. This enables to achieve easier welding by silicon/silicon contact. A similar technique can be applied to the magnetic cover 27 by forming the latter on a silicon plate in which a structure such as represented in FIG. 5 is achieved. In this case, the external surface of the cover is constituted by silicon and the magnetic material fillings end at the periphery, for example, in front of fillings 32 of plate 25.

Figure 6:
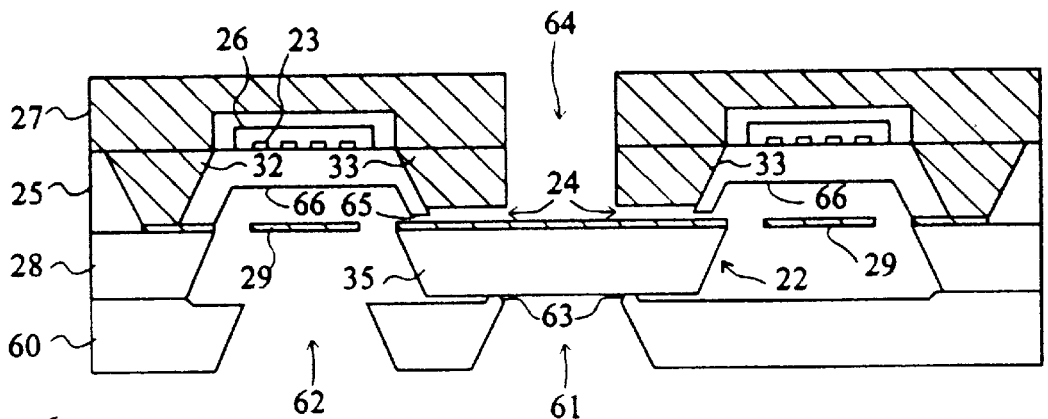
FIG. 6 is a cross-sectional view of a first embodiment of an electromagnetic microvalve according to the invention.
Figure 7:
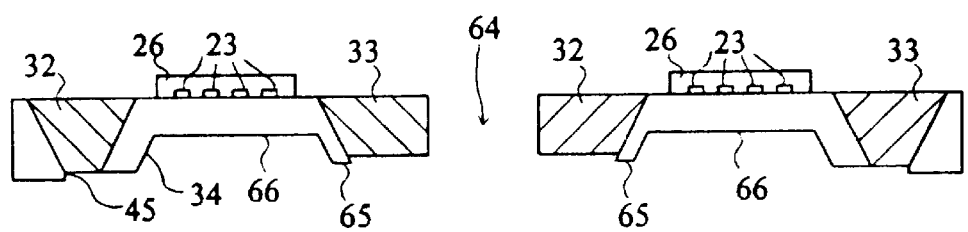
FIG. 7 illustrates an implementation of the method for realizing a first plate of an electromagnetic microvalve as represented in FIG. 6.
Figure 8:
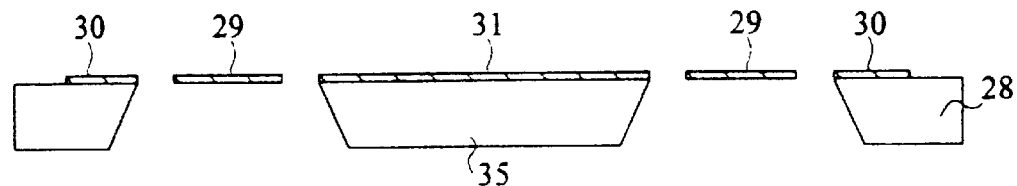
FIG. 8 represents an implementation of a method for realizing a second plate of an electromagnetic microvalve as represented in FIG. 6.
Figure 9A:
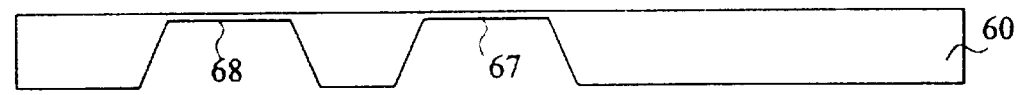
FIGS. 9A and 9B illustrate an implementation of the method for realizing a third plate of an electromagnetic microvalve as represented in FIG. 6.
Figure 9B:
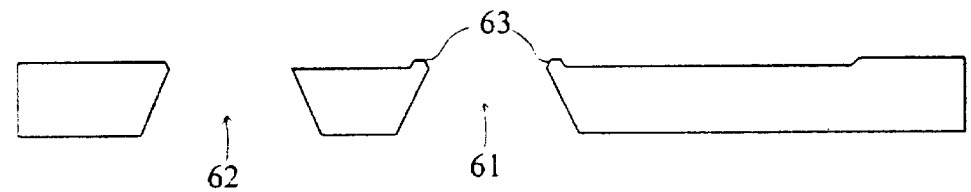
Figure 10:
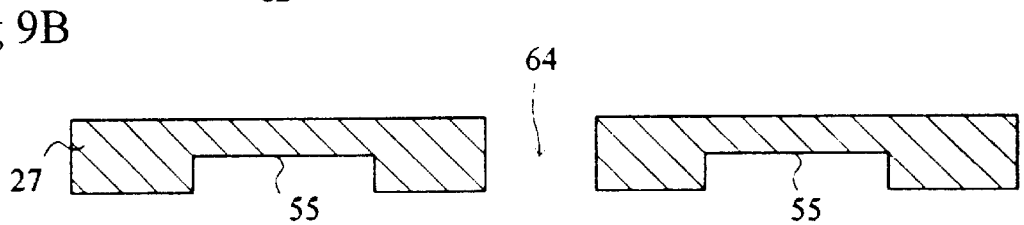
FIG. 10 is a transverse cross-sectional view of a magnetic cover for an electromagnetic microvalve as represented in FIG. 6.

FIGS. 6–10 are transverse cross-sectional views illustrating an embodiment of an electromagnetic microvalve according to the invention in which the actuator is constituted by a structure such as represented in the above figures. FIG. 6 represents a microvalve assembled according to the invention. FIGS. 7, 8 and 10 respectively represent plate 25, plate 28, and the cover 27 of the actuator of the microvalve represented in FIG. 6. FIGS. 9A and 9B represent a third plate, constituting a valve body, at different steps of an implementation of the method according to the invention.

In the following description of a microvalve according to the invention, only the modifications made with respect to the structure of the actuator represented in FIGS. 2A–2C will be disclosed.

A microvalve such as represented in FIG. 6 includes a third plate 60, for example made of silicon, constituting the valve body. This plate 60 has two transverse apertures, for example, for input 61 and output 62 of a fluid for which the valve is designed. The aperture 61 faces the bottom surface of the movable set 35 which constitutes a closing flap for aperture 61. The aperture 62 faces a hanging arm 29 of the actuator. Preferably, a seat 63, for cooperating with the flap 35, is formed at the periphery of the aperture 61.

The first plate 25 includes, in filling 33, a transverse aperture 64 which constitutes an exhaust pipe for the microvalve. The aperture 64 extends in the magnetic cover 27 up to the upper portion of the actuator.

The first plate 25 is slightly modified in order to have, at the periphery of the central area 33, a seat 65 (FIG. 7) for cooperating with the periphery of the central area 31, to ensure sealing between aperture 64 and the valve body when gap 24 is closed. The seat 65 can be combined with a recess 66 in the silicon plate 25, in front of the hanging arms 29, to improve the exhaust function between apertures 62 and 64 when the gap is opened (position represented in FIG. 6).

Figure 3F:
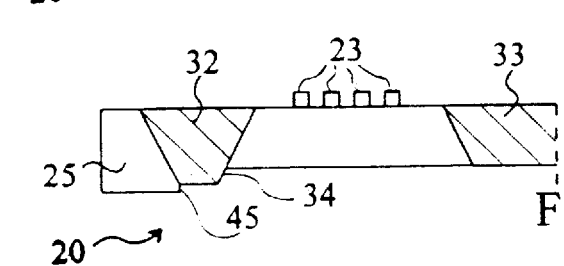
Figure 3G:
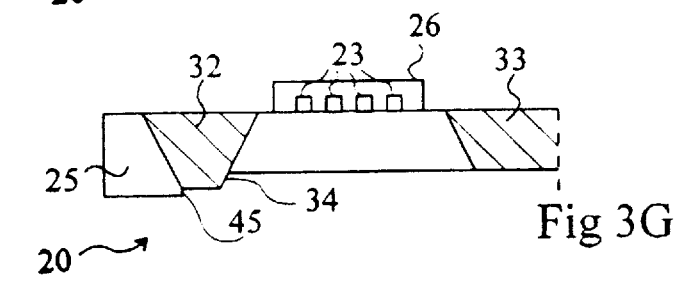

The seat 65 and recess 66 can be formed while shoulder 34 is formed (see FIG. 3F).

Figure 4F:
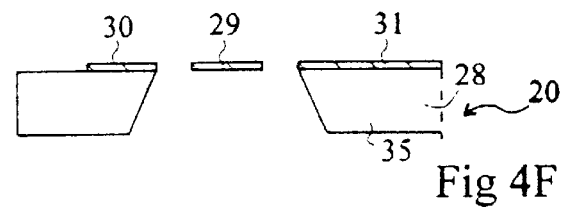

The second plate 28 (FIG. 8) has the same structure as in FIG. 4F.

The plate 60 constituting the valve body is, for example, in a first step anisotropically etched from the bottom surface according to a pattern of deep blanks 67 and 68 (FIG. 9A) corresponding to apertures 61 and 62, respectively. The silicon thickness remaining after this etching step is selected so as to correspond to the height desired for seat 63.

Then, a shallow etching step is achieved (for example, 20 μm) from the front surface of the plate 60 to form seat 63 and to achieve apertures 61 and 62.

Apertures 61 and 62, as well as seats 63 and 65, are preferably circular while being disposed, if required, within square surfaces defined by the two surfaces of the flap 35 with which they respectively cooperate.

The microvalve represented in FIG. 6 constitutes a valve having three ways 61, 62 and 64 and two states (open/close). This valve is a normally closed valve provided that, in the absence of current in the coil, the flap 35 closes the input aperture 61. Furthermore, the valve is a direct control valve since the actuator acts directly on flap 35.

To form a normally opened valve, aperture 64 constitutes the fluid input, aperture 62 constitutes the fluid output and aperture 61 constitutes the exhaust vent.

A switching function between two fluid outputs can also be realized. Then, aperture 62 constitutes the fluid input while apertures 61 and 64 constitute the outputs.

In addition, a normally closed two-way and two-state valve can be realized by eliminating or permanently closing aperture 64. To realize a normally opened two-way and two-state valve, aperture 61 is not formed.

Figure 11:
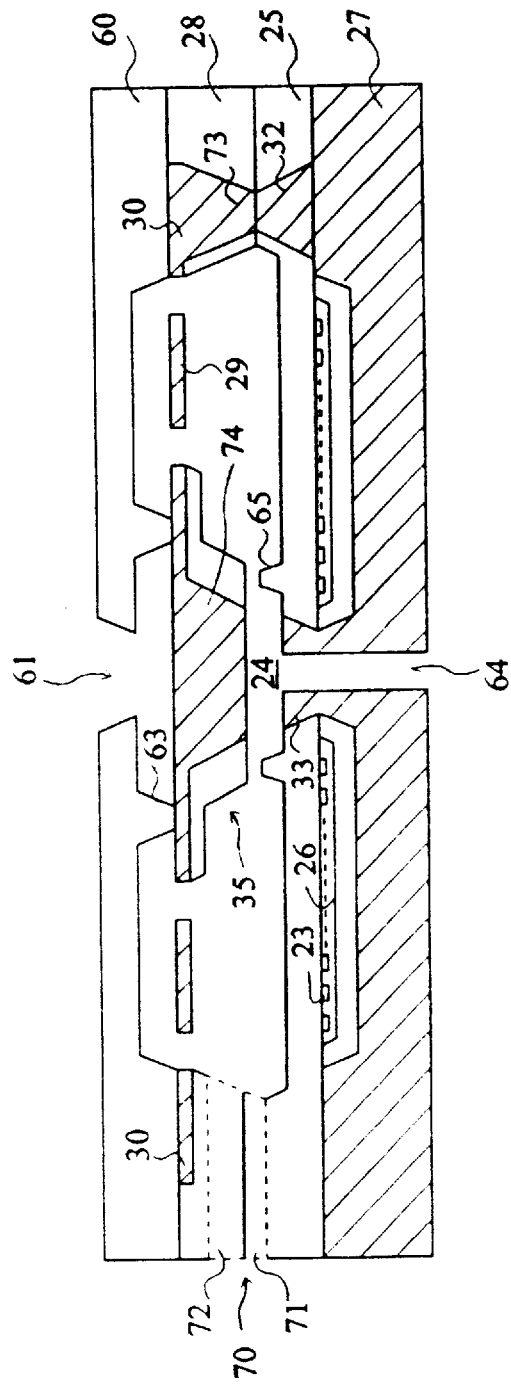
FIG. 11 is a cross-sectional view of a second embodiment of an electromagnetic microvalve according to the invention.

FIG. 11 is a transverse cross-sectional view of a second embodiment of an electromagnetic microvalve according to the invention. The realization of such a microvalve uses the same etching techniques as those disclosed with relation to the above drawings.

This second embodiment differs from the embodiment disclosed with relation to FIG. 6, especially by the presence of a lateral aperture 70 for the passage of the fluid. For this purpose, the hanging arms 29 of flap 35 are formed on the surface of the second plate 28 which faces the third plate 60.

The first plate 25 on which is realized the coil 23 is similar to plate 25 of the first embodiment represented in FIG. 7, except that one of the crossing passages 32 is interrupted to allow the realization of a first portion 71 of the aperture 70.

The second plate 28 of this embodiment comprises a second portion 72 of the lateral aperture 70. The peripheral areas 30 are associated with crossing fillings 73 ensuring the continuity of the magnetic circuit with the fillings 32 of the plate 25. A central filling 74 defines the gap 24 with the central filling 33 of the plate 25.

The third plate 60 is similar to the one represented in FIGS. 9A and 9B, except that only the central aperture 61 is realized in this plate 60.

The magnetic cover 27 is similar to the cover represented in FIG. 10.

The microvalve represented in FIG. 11 constitutes a three-way (61, 70 and 64) two-state (close/open) valve. Assuming that the inlet corresponds to aperture 61 and the outlet to aperture 70, this valve is a normally closed valve where, in the absence of current in the coil, the flap 35 closes the input aperture 61.

To realize a normally-open valve, it is sufficient that the aperture 64 constitutes the inlet, aperture 70 the outlet and aperture 61 the exhaust vent.

To realize a switching function between two fluid outputs, aperture 70 constitutes the fluid input while apertures 61 and 64 constitute the outputs.

A normally closed two-way and two-state valve can also be realized by eliminating or permanently closing aperture 64. To realize a normally opened two-way and two-state valve, aperture 61 is not formed.

As is apparent to those skilled in the art, various modifications can be made to the above disclosed preferred embodiments. For example, each of the materials of the deposited layers can be replaced with one or more materials having the same function.

In addition, the invention and its alternatives have been described only in the case where the plates constituting the structure are silicon plates. Indeed, etching technologies have been mostly developed for silicon. However, it should be noted that, in the described structure, the semiconductive properties of the silicon are not used. Then, other non-magnetic materials could be used to replace silicon, depending upon the desired physico-chemical properties (glass, insulator, and so on).

Although in the above description it has only be referred to a generally square-shaped actuator, the invention enables to realize an actuator having, for example, a rectangular, circular, oval or polygonal shape.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

We claim:

1. A method for fabricating an electromagnetic micro-actuator including a coil (23) for generating a magnetic field that acts on a movable element (35) at least partially made of a magnetic material (31), comprising the following steps:

etching out, from a first surface of a first plate (25), three recesses (43, 44) for defining transverse passageways of a magnetic circuit (20), a central recess (44) being shallower than the two other recesses (43);

filling said recesses (43, 44) with a magnetic material and forming, on said first surface, a coil (23) by a plane winding about the central recess (44);

etching out the surface opposite to said coil (23) so that said magnetic material filling (32, 33) of said recesses (43, 44) appears on the opposite surface while forming a shoulder (34) about and apart from said central recess (44);

forming, in a magnetic material deposited on a second plate (28) and on a surface area equivalent to the surface area in which are included, in the first plate (25), said magnetic material fillings (32, 33), a central portion (31) suspended by arms (29) to a peripheral area (30);

piling said plates (25, 28) by aligning said central filling (33) of the first plate (25) with said central portion (31) of the second plate (28), to define a gap (24) having a movable end defined by said central portion (31) of the second plate (28) and a fixed end constituted by said central filling (33) of the first plate (25); and assembling, over said first surface of the first plate (25), a magnetic cover (27) contacting said fillings (32, 33).

2. The method of claim 1, wherein said plates (25, 28) are made of silicon and wherein said magnetic material is made of ferro-nickel.

3. An electromagnetic micro-actuator comprising:

a coil (23) for generating a magnetic field which acts on a movable element (35) at least partially made of a magnetic material (31);

a magnetic circuit (20) to drive magnetic flux to a gap (24) closable by the motion of said movable element (35), wherein said magnetic circuit includes said magnetic material of said movable element; and, a first plate (25) on a first surface of which is formed the coil (23), in the thickness of which are formed transverse portions (32) of the magnetic circuit (20), and, having a central portion (33) defining a fixed edge of the gap (24).

4. The electromagnetic micro-actuator of claim 3, wherein said movable element (35) constitutes a flap closing at least one passageway (61, 64, 70) of a fluid to form 35 an electromagnetic microvalve.

5. The electromagnetic micro-actuator of claim 4, wherein said passageway is constituted by a transverse aperture (61) formed in a third plate (60) and leading in front of said flap (35).

6. The electromagnetic micro-actuator of claim 4, further including an exhaust aperture (64) leading to said gap (24) from said first plate (25), said exhaust aperture (64) being adapted to be closed by said flap (35).

7. An electromagnetic micro-actuator comprising:

a coil (23) for generating a magnetic field which acts on a movable element (35) at least partially made of a magnetic material (31);

a magnetic circuit (20) to drive magnetic flux to a gap (24) closable by the motion of said movable element (35), wherein said magnetic circuit includes said magnetic material of said movable element;

a first plate (25) on a first surface of which is formed the coil (23) and in the thickness of which are formed transverse portions (32) of the magnetic circuit (20);

a central portion (33) of said first plate (25) defining a fixed edge of the gap (24); and, a second plate (28) from which are formed said movable element (35) and arms (29) for hanging the movable element to peripheral areas (30), wherein the movable element (35) faces said central portion (33) of the first plate (25) with which said movable element defines the gap (24), wherein the movable element (35) and said hanging arms (29) are at least partially made of magnetic material.

8. The electromagnetic micro-actuator of claim 7, wherein said hanging arms (29) are exclusively made of a magnetic material.

9. The electromagnetic micro-actuator of claim 7, wherein said movable element (35) is connected to the central portion (33) of the first plate (25) by a continuous magnetic circuit including the hanging arms (29), transverse portions (32) of the first plate (25) and a magnetic cover (27) abutting against said first surface of the first plate (25).

* * * * *